US011295211B2

(12) United States Patent
Wang et al.

(10) Patent No.: US 11,295,211 B2
(45) Date of Patent: Apr. 5, 2022

(54) MULTI-SCALE OBJECT DETECTION WITH A TRAINED NEURAL NETWORK

(71) Applicant: International Business Machines Corporation, Armonk, NY (US)

(72) Inventors: Junsong Wang, Beijing (CN); Yan Gong, Beijing (CN); Chang Xu, Beijing (CN); Yubo Li, Beijing (CN)

(73) Assignee: International Business Machines Corporation, Armonk, NY (US)

(*) Notice: Subject to any disclaimer, the term of this patent is extended or adjusted under 35 U.S.C. 154(b) by 246 days.

(21) Appl. No.: 16/700,222

(22) Filed: Dec. 2, 2019

(65) Prior Publication Data
US 2021/0166129 A1 Jun. 3, 2021

(51) Int. Cl.
G06N 3/08 (2006.01)
G06F 16/904 (2019.01)
G06N 3/04 (2006.01)

(52) U.S. Cl.
CPC ........... *G06N 3/082* (2013.01); *G06F 16/904* (2019.01); *G06N 3/0472* (2013.01); *G06N 3/0481* (2013.01)

(58) Field of Classification Search
CPC .... G06N 3/082; G06N 3/0472; G06N 3/0481; G06F 16/904
USPC .......................................................... 706/15
See application file for complete search history.

(56) References Cited

U.S. PATENT DOCUMENTS

| 10,262,229 | B1 | 4/2019 | Rao et al. |
| 2017/0124409 | A1 | 5/2017 | Choi et al. |
| 2018/0018535 | A1* | 1/2018 | Li .............................. G06N 3/08 |
| 2019/0058887 | A1 | 2/2019 | Wang |
| 2019/0138814 | A1 | 5/2019 | Schulter et al. |

OTHER PUBLICATIONS

Zhang et al., "Bearing fault diagnosis using multi-scale entropy and adaptive neuro-fuzzy inference", Expert Systems with Applications 37 (2010) 607-6085 (Year: 2010).*
Najibi, et al., "AutoFocus: Efficient Multi-Scale Inference", ICCV2019: IEEE/CVF International Conference on Computer Vision, 2019 (Year: 2019).*

(Continued)

*Primary Examiner* — Tsu-Chang Lee
(74) *Attorney, Agent, or Firm* — Rachel M. Yadlosky

(57) ABSTRACT

A method, system, and computer program product for detecting multi-scale objects. The method may include receiving a sample dataset including multi-scale objects associated with a specific environment, where the sample dataset has an existing resolution. The method may also include inputting the sample dataset into a trained neural network, where the trained neural network has a plurality of scale regions. The method may also include processing the sample dataset for detecting the multi-scale objects by means of the trained neural network. The method may also include calculating a distribution of contribution degree in a course of processing the sample dataset, where the contribution degree is associated with each of the plurality of scale regions. The method may also include generating a set of configuration parameters associated with the specific environment for the trained neural network based at least in part on the distribution of contribution degree.

20 Claims, 10 Drawing Sheets

(56) References Cited

OTHER PUBLICATIONS

Najibi et al., "AutoFocus: Efficient Multi-Scale Inference," University of Maryland, College Park, Printed Oct. 14, 2019, 11 pages, https://arxiv.org/pdf/1812.01600.pdf.

Masana et al., "On-The-Fly Network Pruning for Object Detection," Workshop Track—ICLR 20216, Printed Oct. 14, 2019, 5 pages, https://www.researchgate.net/profile/Marc_Masana/publication/302947384_On-the-fly_Network_Pruning_for_Object_Detection/links/59bf9273a6fdcca8e56f9a55/On-the-fly-Network-Pruning-for-Object-Detection.pdf?origin=publication_detail.

Liu et al., "SSD: Single Shot MultiBox Detector," Cornell University, Computer Science, Computer Vision and Pattern Recognition, ECCV 2016, 1 page, https://arxiv.org/abs/1512.02325.

* cited by examiner

MULTI-SCALE OBJECT DETECTION WITH A TRAINED NEURAL NETWORK

BACKGROUND

The present disclosure relates to artificial neural networks, and more specifically to detecting multi-scale objects by means of a trained neural network.

SUMMARY

The present invention provides a computer-implemented method, system, and computer program product to detect multi-scale objects via trained neural network. The method may include receiving a sample dataset including multi-scale objects associated with a specific environment, where the sample dataset has an existing resolution. The method may also include inputting the sample dataset into a trained neural network, where the trained neural network has a plurality of scale regions. The method may also include processing the sample dataset for detecting the multi-scale objects by means of the trained neural network. The method may also include calculating a distribution of contribution degree in a course of processing the sample dataset, where the contribution degree is associated with each of the plurality of scale regions. The method may also include generating a set of configuration parameters associated with the specific environment for the trained neural network based at least in part on the distribution of contribution degree. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
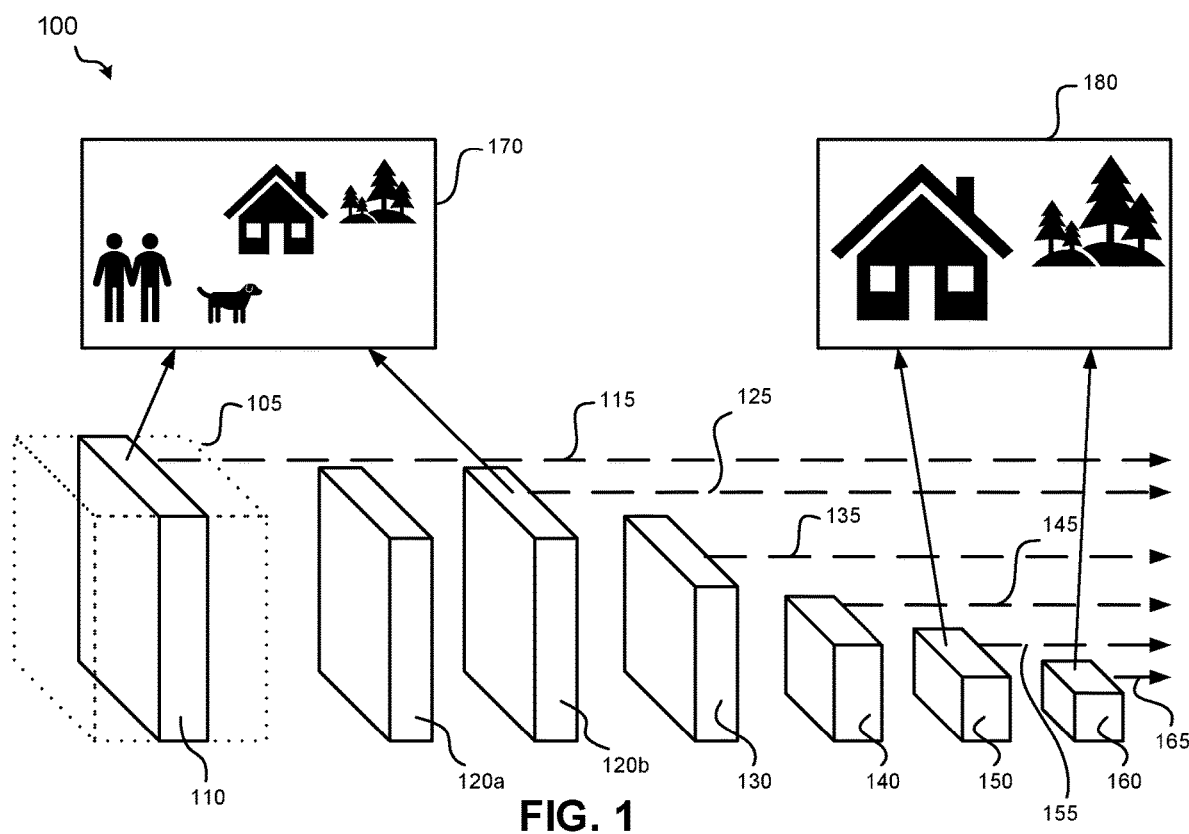
FIG. 1 depicts a schematic diagram of an exemplary trained neural network, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Artificial neural networks have become mainstream solutions in computer vision use cases and have achieved remarkable results in most major applications, more particularly, in detecting objects. To detect objects with multiple scales in a complex specific environment, convolutional neural networks (CNN) have been widely employed recently and may include several respective convolutional layers for objects of different scales. Furthermore, nodes and connections (components of a neural network) may be allocated in or between convolution layers for increasing accuracy. In the technical field of multi-scale-object detection, structures of convolutional neural networks may have become bigger and more complex in order to achieve high detecting accuracy. But the increased network sizes and complexity may be a particular problem in the specific environment where computing resources, such as system memory or CPU processing capability, are limited. Thus, techniques for reducing computational costs (and/or system memory requirements) of artificial neural networks (e.g., convolutional neural networks), sometimes referred to as neural network optimization (or, in some instances, neural network compression), are expected to detect multi-scale objects and, more particularly, to perform the detecting of the multi-scale objects in the specific environment. Multi-scale object detection may refer to image detection of an object using multiple scales. In some instances, a multi-scale object is an object that occurs on multiple scale levels. Regarding computational costs with respect to artificial neural networks (e.g., convolutional neural networks) working in the specific environment, one general resolution direction for neural networks optimization (or, in some instances, compression) may be to perform network pruning. At this point, a subset of the nodes and/or connections may be removed from artificial neural networks and, more specifically, from convolution layers in convolutional neural networks by adjusting network parameters used in training the artificial neural networks. However, network pruning done in the training of the artificial neural networks may typically pursue universality and flexibility, in an attempt to make the artificial neural networks appropriate for various scenarios. As a result, the pruned neural networks may not be appropriate for a specific scenario. On the other hand, if network pruning is too restrictive in the training, the universality and flexibility of the artificial neural networks may be unfitly limited. In addition, when training, network pruning may require significant efforts (for example, by using excess training time and memory usage). For this reason, it is difficult to repeat the network pruning of an already-trained network if a specific environment is inconsistent with prior training results.

Generally, the present disclosure is associated with neural network optimizing methods in computer vision regions. In particular, the present disclosure provides a method for detecting multi-scale objects by means of a trained neural network to reduce computational costs (and memory requirements) associated with the specific environment. In the specific environment, computation resources may be limited by various factors, such as budgets of purchasing computer devices, power limitation, CPU processing speeds, system memory sizes, storage device capacities or cooling system efficiencies, etc. Thus, methods of reduction of computational costs (and memory requirements) of detecting objects with neural networks is desired.

On the other hand, deep neural networks are often trained for detecting problems of multi-scale objects by means of many scale regions (for example, by using numerous scale regions). For instance, convolutional layers may include different feature map sizes and/or filter sizes, in the deep neural networks. In some instances, this is partially to ensure wide applicability of the neural networks and partially to benefit from multi-scale data in the neural networks (for example, training examples from one scale can increase performance of another scale because they share features among several layers). In the specific environment, however, users might want to apply the neural networks (for example, for working or testing purposes) to perform inferences on a set of visual data which are highly internally correlated. The set of visual data may only contain a limited subset of original scales and, consequently, will result in activations of a respective limited subset of the scale regions based on the limited subset of original scales. Thus, it is recognized that applying all scale regions in the neural networks to the whole inference may result in a considerable amount of wasted computation resources in the specific environment.

Reduction of computational costs (and memory requirements) when detecting objects using neural networks may be desired. Conversely, the wasted computation resources in the specific environment may be considerable while applying neural networks to multi-scale object detection (by means of all scale regions). Thus, it may be necessary to provide a method to solve the problem which has been described in the present disclosure. The method may generate a set of configuration parameters for a trained neural network with several scale regions associated with the specific environment. This generation may be based on a distribution of contribution degree for detecting multi-scale objects on each of the scale regions during at least a portion of the process of processing an input sample visual dataset obtained from the specific environment (for example, for detecting the multi-scale objects). The set of configuration parameters may comprise an array of to-be-pruned scale regions and/or a resolution reduction ratio of input visual data associated with the specific environment. When performing multi-scale object detection in the specific environment, the trained neural network may only employ some of the scale regions (for instance, one or more of a plurality of scale regions) based on the set of configuration parameters to avoid unnecessary computational costs. For example, only half of the scale regions (such as a first region and a second region) of the total scale regions (e.g., a first, second, third, and fourth region) may be employed.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Referring now to FIG. 1, one exemplary neural network 100 for detecting multi-scale objects, according to the present disclosure is depicted in FIG. 1.

As shown in FIG. 1, an exemplary trained neural network 100 is depicted, for example, a trained Single Shot Detector (SSD) neural network. The trained SSD neural network may be based on a feed-forward convolutional neural network that produces a fixed-size collection of bounding boxes and scores (for the presence of object class instances in those boxes), followed by a non-maximum suppression (NMS) step to produce final detections. Early network layers of SSD neural networks are based on a standard architecture employed for high quality (resolution) image classification (truncated before any classification layers), which may be referred to as a base network.

In some instances, the trained neural network 100 may employ a base network 105. In some instances, a VGG-16 network is employed as the base network 105, but other types of neural networks can also be employed to produce good results. In some embodiments, according to requirements for detecting multi-scale objects, auxiliary structures have been added to the base network 105 to produce a multi-scale detection function, which predicts offsets to default boxes of different scales and/or aspect ratios and their associated confidence(s). The auxiliary structures may comprise several feature layers (e.g., feature layers 115, 125, 135, 145, 155, and 165) to achieve high detection accuracy, which may produce predictions of different scales based on feature maps generated from different scales, and may explicitly separate the predictions by aspect ratio. In the present disclosure, a set of feature layers related to one of the different scales is defined as a scale region. Thus, the trained neural network 100 also comprises a plurality of scale regions (e.g., scale region 110, 120a, 120b, 130, 140, 150, and 160) associated with the feature layers 115, 125, 135, 145, 155, and 165 for detecting multi-scale objects. When the trained neural network 100 performs a detection of multi-scale objects, each of the scale regions with a specific size is employed to output a feature map with a respective size related to detecting a respective object with a specific scale.

In some embodiments, a plurality of convolutional feature layers, such as scale regions 110, 120a, 120b, 130, 140, 150, and 160, have been added to the end of the base network as auxiliary structures to effectively detect objects. Furthermore, the plurality of convolutional feature layers decreases in size progressively (to form a pyramid structure) and allows predictions of detections at multiple scales. Thus, the trained neural network 100 may also include a plurality of scale regions to form a pyramid structure associated with the feature layers for detecting multi-scale objects.

In some embodiments, each added convolutional feature layer (or optionally an existing feature layer from the base network) can produce a fixed set of detection predictions using a set of convolutional filters. For a feature layer with a size of m×n with p channels, a basic element for predicting parameters of a potential detection is a small kernel with a size of 3×3×p that produces either a score for a category, or a shape offset related to a default box coordinate. For example, scale region 110 may have a size 3×3×1024, scale regions 120a and 120b may have a size 1×1×1024, scale region 130 may have a size 1×1×256, and scale regions 140, 150, and 160 may have a size 1×1×128. At each of the m×n locations where the small kernel is applied, an output value may be produced. Output values of the bounding boxes offset may be measured based on a position of a default box related to each feature map location.

In some embodiments, a convolutional model for predicting detection of the multi-scale objects is different for each convolutional feature layer.

In some embodiments, the neural network further comprises at least one fully connected layer. The at least one fully connected layer may be an intermediate fully connected layer or a terminal fully connected layer which may generate output values to a final output of the neural network. In some instances, the terminal fully connected layer employs Softmax regression to classify the objects, thus the terminal fully connected layer is also called a Softmax layer.

In some embodiments, the trained neural network 100 may include a plurality of scale regions that can handle the multi-scale objects (with different scale regions) effectively. In network training, each of the plurality of scale regions (e.g., scale regions 110, 120a, 120b, 130, 140, 150, and 160) in the convolutional neural network is employed for a box regression. The box regression may be followed by a combined Non-Maximum Suppression (NMS) algorithm to reduce repetitive boxes. In objects inference, however, each of the plurality of scale regions may have a different contribution degree for detecting the multi-scale objects according to a spatial resolution of each of the plurality of scale regions. The spatial resolution of a scale region may be based on the size of the future map outputted from the convolutional layers comprised in the scale region. The scale region with a higher resolution feature map, for instance a 38×38 resolution of the feature map generated by a Conv4_3 convolutional layer (e.g. scale region 110) of VGG-16 (e.g., base network 105), may have higher spatial resolution than the scale region with a lower resolution feature map, for instance a 1×1 resolution of the feature map generated by a Conv11_2 convolutional layer (e.g. scale region 160). In multi-scale objects inference, the scale regions may be used for box regressions to detect the different scales objects by means of the respective feature maps with different resolution.

In some embodiments, a set of visual data associated with a specific environment that is inputted into the trained neural network is related to a distant shot or a far view (e.g., far view 170), and most of the objects in the set of visual data, compared to the objects related to a normal shot or view, have small scales. The scale regions with high spatial resolution, such as scale region 110, 120a, or 120b, have better capacities to detect small scale objects, thus the scale regions with high spatial resolutions may be used for box regressions to detect the small scale objects. As a result, the scale regions with high spatial resolution may have high activation frequencies which can be obtained by the neural network and/or computer system, and may be calculated to produce respective activation probabilities to indicate contribution degrees for detecting multi-scale objects. Conversely, the scale regions with low spatial resolutions, such as scale region 150 and/or 160, may have worse capacities to detect small scale objects, thus the scale regions with low spatial resolutions may not be used for box regressions to detect small scale objects. As a result, the activation frequencies may be low and the respective activation probabilities to indicate the contribution degrees for detecting multi-scale objects in present objects detection are also low. The different activation probabilities (i.e., the different contribution degrees) for detecting multi-scale objects may provide an opportunity to prune the trained neural network by pruning the scale regions which are not fully used in the multi-scale objects detection, for instance the scale regions (e.g., scale regions 110, 120a, and 120b) with low spatial resolutions in detecting small scale objects related to the distant shot or far view (e.g., far view 170), to reduce computational costs of the multi-scale object detection.

Similarly, while the set of visual data associated with the specific environment inputted into the neural network is related to a close shot or near view (e.g., near view 180), most of the objects in the set of visual data, compared to the objects related to a normal shot or view, have large scales. The scale regions with low spatial resolutions have good capacities to detect large scales objects and have high activation frequencies, which are consistent with the good capacities, to detect large-scale objects. Conversely, the scale regions with high spatial resolutions have worse capacities and efficiencies to detect large scale objects, thus, the scale regions with high spatial resolutions may not have been used (or at least fully used), and the respective activation probabilities to indicate the contribution degrees for detecting multi-scale objects in the present scenario may be low. Therefore, the similar method of pruning neural networks is also available for pruning the scale regions which are not used, or not fully used, in the multi-scale objects detection from the trained neural network. For example, a similar method may be used to prune the scale regions (e.g., scale regions 150 and 160) with low spatial resolutions in detecting small scale objects related to the close shot or near view (e.g., near view 180).

Generally, the method of pruning neural networks by pruning scale regions that are not used (or are not fully used), for instance with low contribution degrees for detecting multi-scale objects from the trained neural networks, may be available in various statuses needed to reduce the computational costs and/or system memory requests. Reducing the resolution of the set of visual data, however, has more benefits and is more efficient for reducing the computational costs and/or system memory requests in some scenarios where most of the objects in the set of visual data are large scale objects and the scale regions with high spatial resolutions have not been fully used to detect the large scale objects. For instance, the amount of data to be processed is adjusted (e.g. reduced) to a quarter of original amount of data to be processed when height and width of the set of visual data are reduced to a half of an original height and width, which means the resolution reduction ratio to be applied to the set of visual data is 0.5. Thus, the amount of data to be processed has been reduced along with the resolution of the set of visual data. Furthermore, adjusted scales of the large scale objects in the set of visual data may also be reduced to smaller scales (smaller than the original scales), along with reducing the resolution of the set of visual data. For instance, the adjusted scales (e.g. height and width) of the large scale objects may have been reduced to a half of the original scales by means of using the resolution reduction ratio. Therefore, the scale regions with high spatial resolutions might be used to detect the adjusted objects with smaller scales (and may be used less to detect objects with the original scales), and as a result, the contribution degrees for detecting multi-scale objects of the scale regions with high spatial resolutions have been increased to generate an updated distribution of contribution degree for detecting multi-scale objects on each of the plurality of scale regions. According to resolution reduction of the set of visual data and the updated distribution of contribution degree, the method of pruning neural networks disclosed in the presents disclosure may be performed once again to further reduce the computational costs and/or system memory requests.

Figure 2:
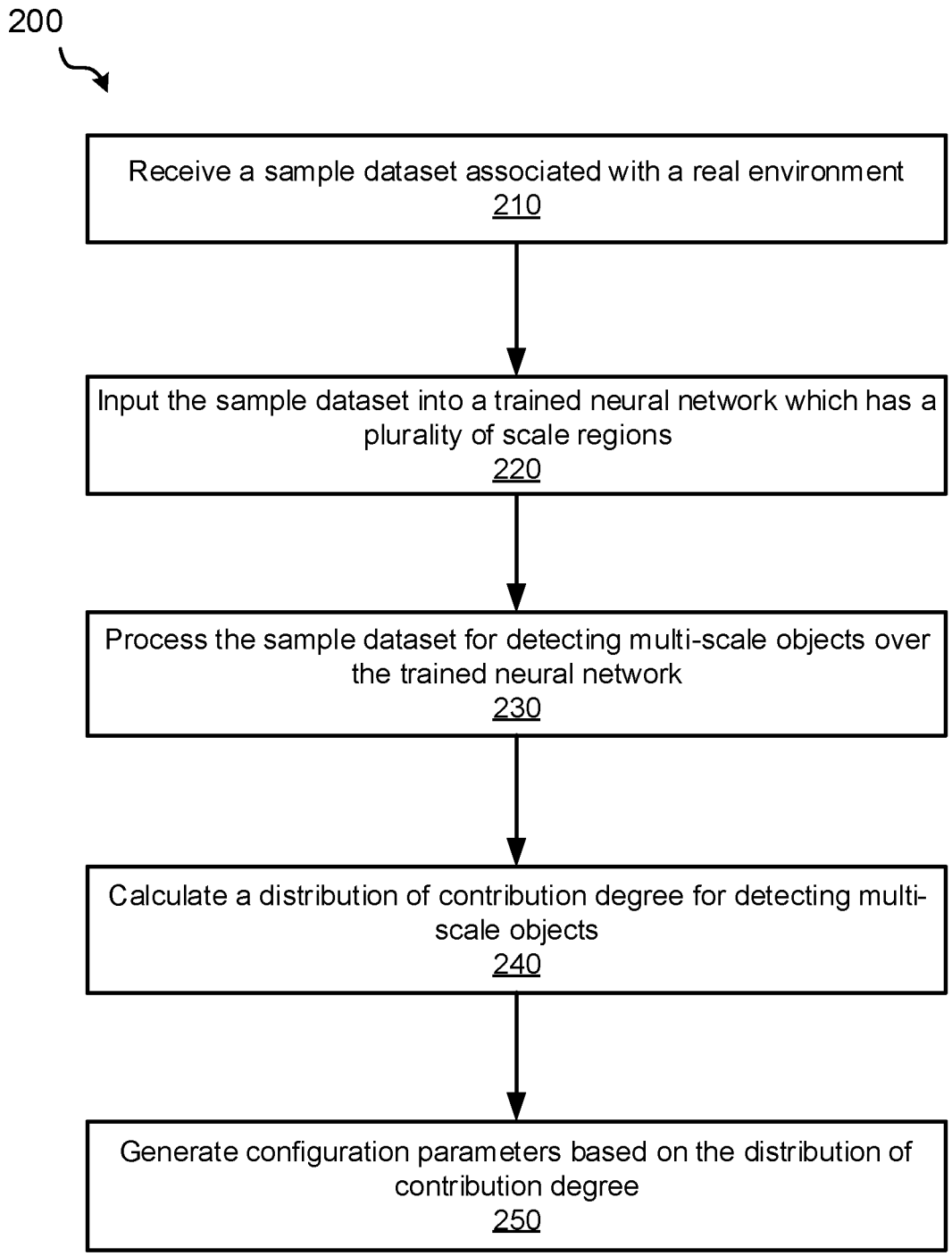
FIG. 2 depicts a flowchart of a set of operations for generating configuration parameters, according to some embodiments.

With reference now to FIG. 2, an example method 100 of generating configuration parameters is depicted, according to some embodiments. Generally, the method 100 may be a correlated example in regard to detecting multi-scale objects by means of a trained neural network, for instance the trained SSD neural network 100 depicted in FIG. 1.

Figure 9:
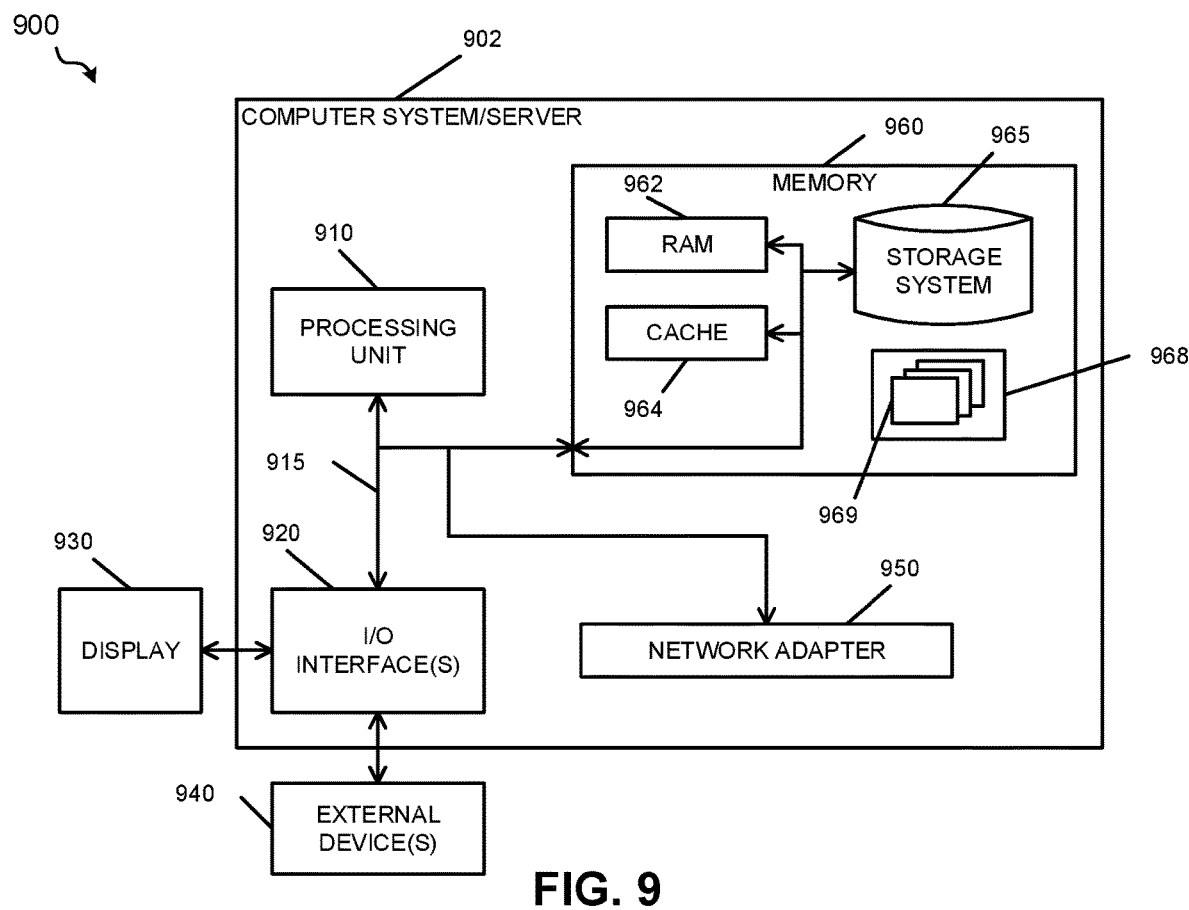
FIG. 9 depicts a block diagram of a sample computer system, according to some embodiments.

The process flow 200 begins at block 210, where a sample dataset including multi-scale objects is associated with a specific environment (for instance, the sample dataset has an existing resolution) is received by a computer system/server (e.g., computer system/server 902, FIG. 9). For instance, a sample dataset of video may be captured and generated by a fixed camera (which may be deployed at a ceiling of an airport exit for video security monitoring system), and the sample dataset may include plenty of objects to be processed with different scales such as passengers (adults or children), baggage, goods, animals, etc. The sample dataset of video might have an existing resolution when the raw video is generated by the fixed camera, such as a resolution of 1024×768 (or higher). In some instances, the sample dataset may have been normalized into an existing resolution for object detection by means of neural networks, such as 512×512 or 300×300, etc., before starting the object detection. The normalization of the resolution of the sample dataset might be performed by means of a computer system/server or any other video editing/processing device(s).

At block 220, a computer system/server inputs the sample dataset into a trained neural network, for instance, the trained SSD neural network 100 (FIG. 1). The trained neural network may have a plurality of scale regions for detecting the multi-scale objects. In general, the trained neural network may have been trained for detecting multi-scale objects using many scale regions, for instance, convolutional layers with different feature maps sizes and/or filter sizes in deep neural networks, to ensure wide applicability of the trained neural networks. In some instances, neural networks are known to benefit from multi-scale data (for instance, additional training examples from one scale can increase performance of another scale), because features of objects are shared among several layers.

In some embodiments, the trained neural network is a convolutional neural network which has a plurality of scale regions. Each of the plurality of scale regions comprises one or more convolutional layers, such as SSD neural network.

In some embodiments, the trained neural network is a convolutional neural network which further has one or more fully connected layers (besides the one or more convolutional layers comprised in each of the plurality of scale regions), such as YOLO v3 (You Only Look Once v3) or Region-CNN neural network.

In some embodiments, each of the plurality of scale regions generates a feature map with a specific size (e.g. spatial resolution) related to detecting a respective object with a specific scale.

In some embodiments, the plurality of scale regions progressively decreases in size of the feature maps to form a pyramid structure. The low-level (front) scale regions in the pyramid structure have high spatial resolutions based on large sizes of the feature maps, and high-level (latter) scale regions in the pyramid structure have low spatial resolutions based on small sizes of the feature maps. As a result, the low-level scale regions in the pyramid structure may have capabilities to detect small scale objects from the large sizes of the feature maps, and high-level scale regions in the pyramid structure may have difficulties detecting small scale objects but have higher efficiency on detecting large scale objects.

At block 230 the sample dataset is processed by the trained neural network, which detects the multi-scale objects. For instance, the trained SSD neural network, which is based on a feed-forward convolutional neural network, produces a fixed-size collection of bounding boxes and scores for the presence of object class instances in those boxes, followed by a non-maximum suppression (NMS) step to produce final detections.

At block 240, a distribution of contribution degree in the course of processing the sample dataset is calculated by the computer system/server. The distribution of contribution degree may be associated with each of the plurality of scale regions.

At block 250, for reducing the computational costs, a set of configuration parameters (associated with the specific environment) is generated by the computer system/server. The set of configuration parameters for the trained neural network is based on the distribution of contribution degree, and may also be based on other available factors.

As shown in FIG. 2, the present disclosure provides a method for reducing the computation cost in object detection associated with a specific environment, by means of the trained neural network including a plurality of scale regions. The method is based on the distribution of contribution degree for detecting multi-scale objects on each of the plurality of scale regions in the course of detection and generation of the set of configuration parameters for the trained neural network. Furthermore, the computer system/server processes raw visual data obtained from the specific environment by means of the trained neural network for detecting multi-scale objects based on the set of configuration parameters, the computational costs of the object detection is effectively reduced in respond to adjusting the processing according to the set of configuration parameters.

Figure 3:
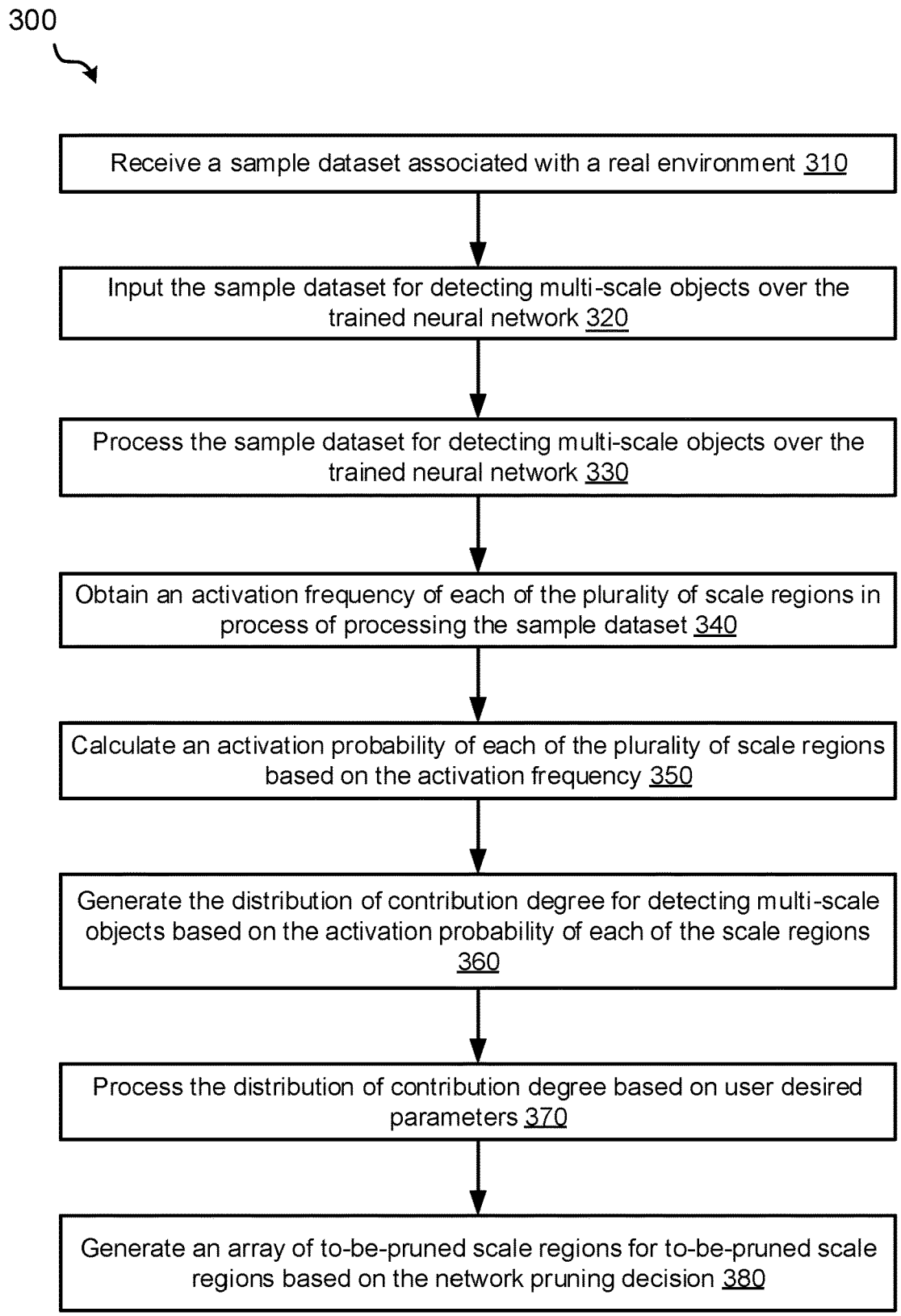
FIG. 3 depicts a flowchart of a set of operations for generating an array of to-be-pruned scale regions, according to some embodiments.

With reference now to FIG. 3, a method 300 for generating an array of to-be-pruned scale regions is depicted, according to some embodiments. The example method 300 comprises specific steps, including generating a distribution of contribution degree for detecting multi-scale objects according to each of the plurality of scale regions in the course of processing the sample dataset based on an activation probability of each of the plurality of scale regions. Furthermore, the specific steps may include generating an array of to-be-pruned scale regions based on a network pruning decision according to the distribution of contribution degree and one or more user desired parameters related to pruning the trained neural network.

The method 300 begins at block 310, where a sample dataset including multi-scale objects associated with a specific environment is received by the computer system/server. In this example, the sample dataset may have an existing resolution. At block 320, the computer system/server inputs the sample dataset into a trained neural network which has a plurality of scale regions for detecting the multi-scale objects.

At block 330, the sample dataset is processed by the trained neural network, which detects the multi-scale objects. For instance, the trained SSD neural network, which may be based on a feed-forward convolutional neural network that produces a fixed-size collection of bounding boxes and scores for the presence of object class instances in those boxes, may be followed by a non-maximum suppression (NMS) step to produce final detections.

At block 340, the computer system/server obtains an activation frequency of each of the plurality of scale regions in the course of processing the sample dataset for detecting the multi-scale objects. The activation frequency indicates, for instance, the amount of detected objects by one of the plurality of scale regions in the course of processing the sample dataset, as long as one object has been detected by the one of the plurality of scale regions in processing the sample dataset. At the end of the processing, scale regions with high spatial resolution may have high activation frequencies of detecting small scale objects. On the other hand, scale regions with low spatial resolution may have low activation frequencies of detecting small scale objects, but may have high activation frequencies of detecting large scale objects.

In some embodiments, the activation frequency is also obtained or derived by computational load, such as total number of floating-point calculations, of each of the plurality of scale regions during the process of processing the sample data for detecting the multi-scale objects. The computational load of each of the plurality of scale regions can be obtained by any applicable method or operation in the prior art.

At block 350, the computer system/server calculates an activation probability of each of the plurality of scale regions associated with the specific environment. The activation probability is associated with the activation frequency of each of the plurality of scale regions.

In some embodiments, the amount of detected objects by each of the plurality of scale regions in the course of processing the sample dataset (for example, the activation frequency of each of the plurality of scale regions) is divided by an amount of detected objects (detected by all of the plurality of scale regions) in order to calculate the activation probability of each of the plurality of scale regions.

In some embodiments, the activation probability of each of the plurality of scale regions is calculated based on dividing the computational load, such as total number of floating-point calculations, by a total computational load of the trained neural network during the same process. The computational load may refer to the computational load of each of the plurality of scale regions during the whole process of processing the sample data for detecting the multi-scale objects.

At block 360, the computer system/server generates a distribution of contribution degree in the course of processing the sample dataset according to the activation probability of each of the plurality of scale regions. The contribution degree of each of the plurality of scale regions for detecting multi-scale objects is proportional to the activation probability of each of the plurality of scale regions for detecting multi-scale objects in the whole process of processing the sample dataset. Therefore, the distribution of contribution degree may be generated from the distribution of the activation probability of each of the plurality of scale regions.

At block 370, the computer system/server processes the distribution of contribution degree, based on one or more user desired parameters related to pruning the plurality of scale regions, to obtain a network pruning decision. The network pruning decision comprises a set of configuration parameters to lead a subset of the scale (for example, with low contribution degrees) to be removed or suspended from the trained neural network, in the later multi-scale objects detection, by adjusting structure of the neural network according to the network pruning decision.

At block 380, the computer system/server generates an array of to-be-pruned scale regions for one or more pruned scale regions based on the network pruning decision, where the array of to-be-pruned scale regions excludes at least one scale region in the plurality of scale regions. Furthermore, the computer system/server processes raw visual data obtained from the specific environment by means of the trained neural network for detecting multi-scale objects based on the set of configuration parameters (which comprises the array of to-be-pruned scale regions). The trained neural network may be adjusted through the set of configuration parameters, which may include the array of to-be-pruned scale regions. As a result, the computational efficiency and speed have been increased, meanwhile, the computational costs may have been reduced. To allow the trained network to run normally, at least one of the scale regions may be excluded from the array of to-be-pruned scale regions.

In some embodiments, one or more user desired parameters related to pruning the plurality of scale regions, for instance a desired parameter inputted into the computer system/server by users in advance, comprise at least one first threshold value of the activation probability (for example, a threshold value between 0 to 1). As a result, each of the scale regions with an activation probability under the first threshold value may be included in the array of to-be-pruned scale regions. The value of the first threshold value of the activation probability may be set according to requests or expectations of the users, and may be reset according to the effect to reduce the computational costs.

Figure 4:
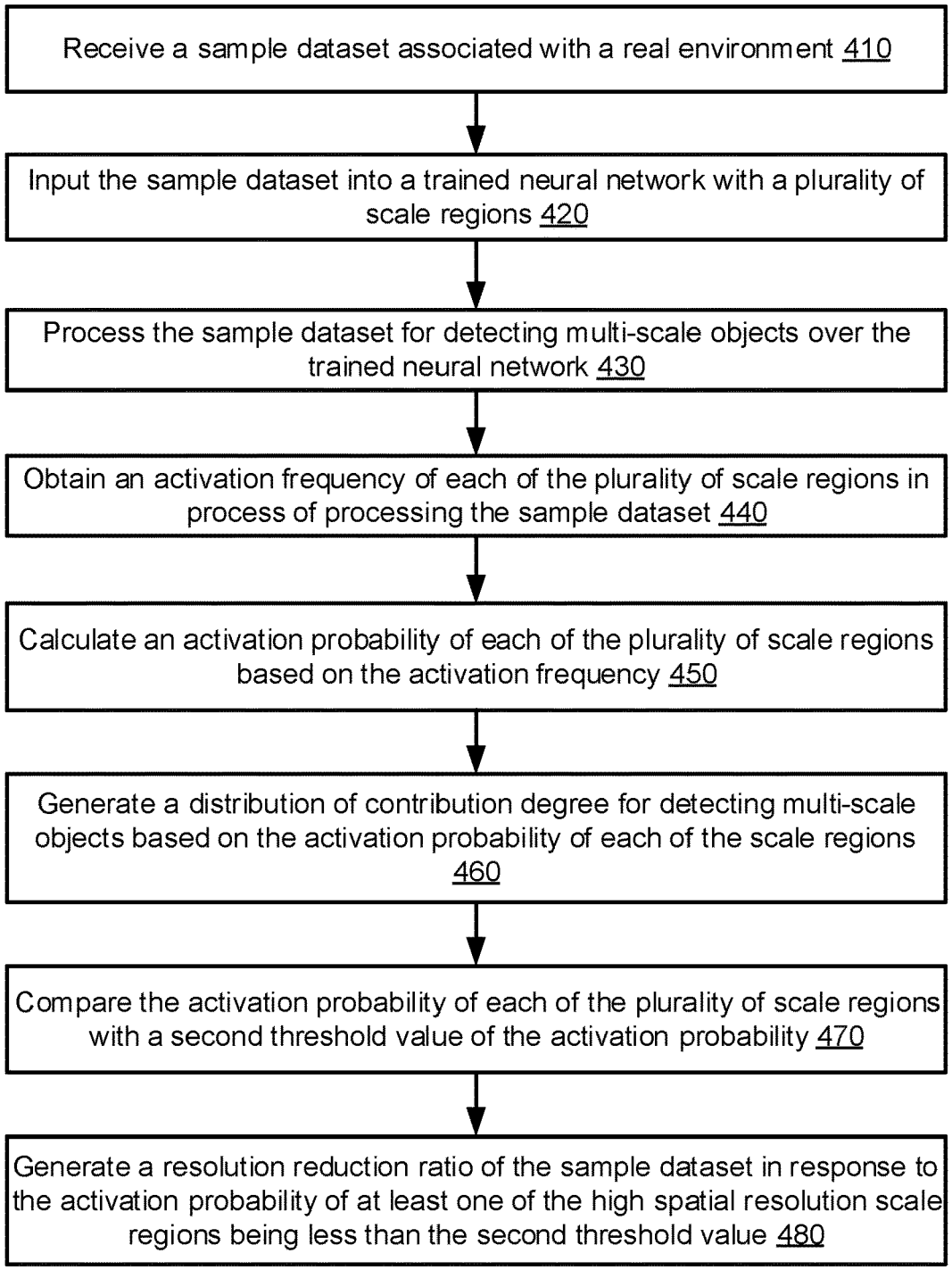
FIG. 4 depicts a flowchart of a set of operations for generating a resolution reduction ratio of the sample dataset, according to some embodiments.

With reference now to FIG. 4, a flowchart of a method 400 for generating a resolution reduction ratio of the sample dataset is depicted, according to some embodiments. The example method 400 may include specific steps, such as comparing the activation probability of each of the plurality of scale regions with a second threshold value of the activation probability, then generating a resolution reduction ratio for the sample dataset in respond to result of the comparing.

The process flow 400 begins at block 410, where a sample dataset including multi-scale objects associated with a specific environment is received by the computer system/server. The sample dataset may have an existing resolution.

At block 420, the computer system/server inputs the sample dataset into a trained neural network. The trained neural network has a plurality of scale regions for detecting the multi-scale objects.

At block 430, the sample dataset has been processed for detecting the multi-scale objects by means of the trained neural network.

At block 440, the computer system/server obtains an activation frequency of each of the plurality of scale regions in the course of processing the sample dataset for detecting the multi-scale objects.

At block 450, the computer system/server calculates an activation probability of each of the plurality of scale regions associated with the specific environment. The activation probability is associated with the activation frequency of each of the plurality of scale regions.

At block 460, the computer system/server generates a distribution of contribution degree in the course of processing the sample dataset according to the activation probability of each of the plurality of scale regions.

At block 470, the computer system/server compares the activation probability of each of the plurality of scale regions with a second threshold value of the activation probability. The second threshold value may be a value indicating requests or expectations of users on reducing the computational costs, for instance, between 0 to 1, and can be set by users in advance. In some instances, the second threshold value is equal to the first threshold value of the activation probability. In other instances, the second threshold value is more than the first threshold value of the activation probability to more effectively reduce the computational costs.

At block 480, the computer system/server generates a set of configuration parameters comprising a resolution reduction ratio for the sample dataset in response to the activation probability of at least one of the scale regions having a high spatial resolution less than the second threshold value. The resolution reduction ratio may increase the activation probability of the at least one of scale regions with a high spatial resolution to at least meet the second threshold value by reducing the existing resolution (for instance, by multiplying the existing resolution by the resolution reduction ratio). The high spatial resolution is a relatively high value of spatial resolution in all of spatial resolutions of the scale regions in the trained neural network (for instance, a 38×38 resolution of the Conv4_3 convolutional layer (e.g. scale region 110) of VGG-16 comprised in the exemplary SSD network depicted in FIG. 1) but is not limited to the highest value of spatial resolution in all of spatial resolutions of the scale regions in the trained neural network. As discussed herein, reducing the resolution of the set of visual data has more benefits and a greater efficiency for reducing the computational costs and system memory requests in some scenarios where most of the objects in the set of visual data are large scale objects and the scale regions with high spatial resolutions have not been used (or at least not been fully used) to detect the large scale objects. The scale regions with high spatial resolutions might be more beneficially used to detect the adjusted objects with smaller scales than the original scales. As a result, the activation probability of the at least one of scale regions which has a high spatial resolution has been increased. The activation probability of the at least one of the scale regions can be increased to meet the second threshold value by multiplying the existing resolution by the resolution reduction ratio to reducing the resolution of the sample dataset. As a result, the amount of data to be processed and relevant recognizing time effectively have been reduced along with reducing the resolution of the set of visual data based on the resolution reduction ratio.

Figure 5A:
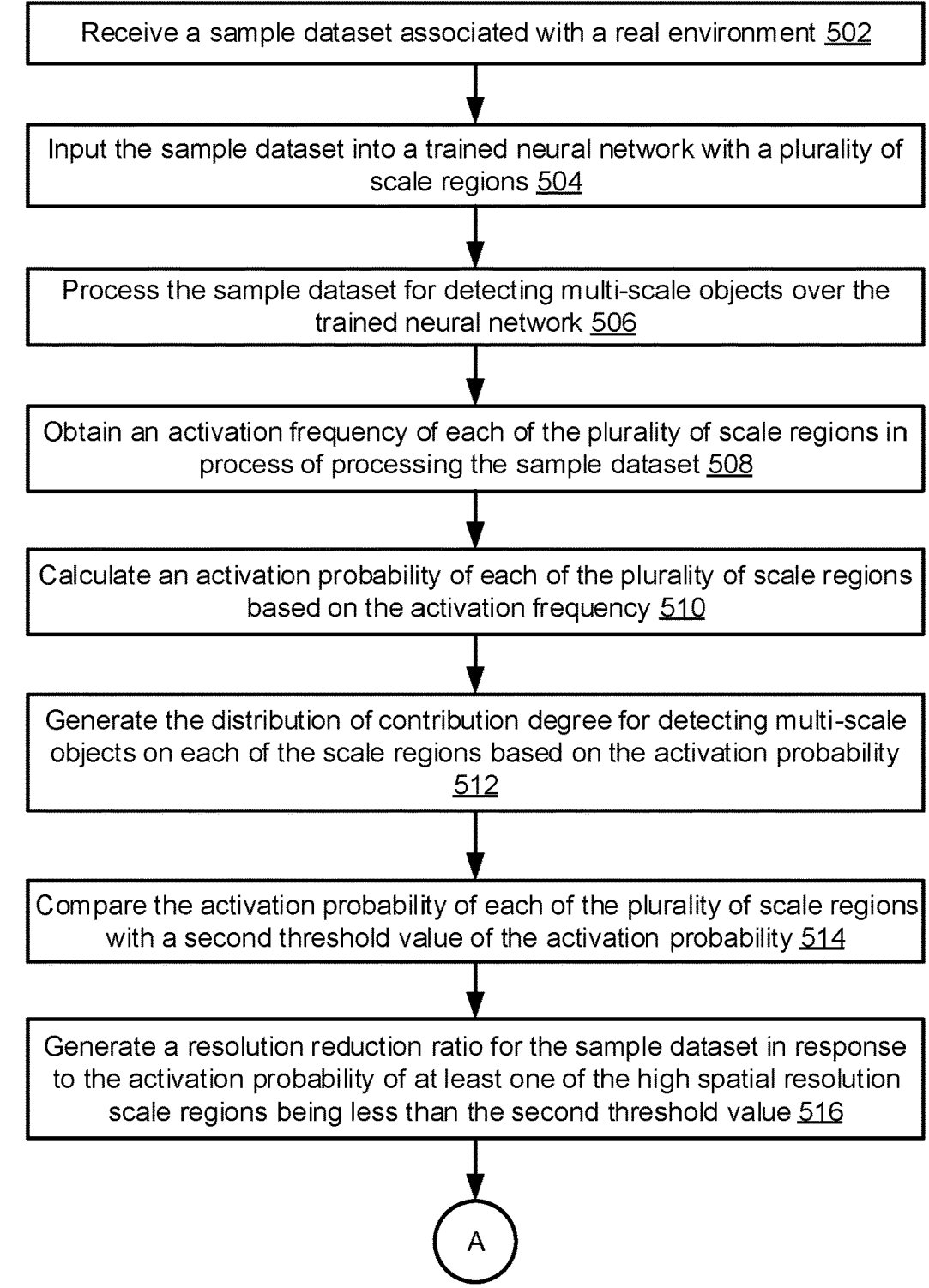
FIG. 5A depicts a flowchart for a first part of a set of operations for updating configuration parameters, according to some embodiments.
Figure 5B:
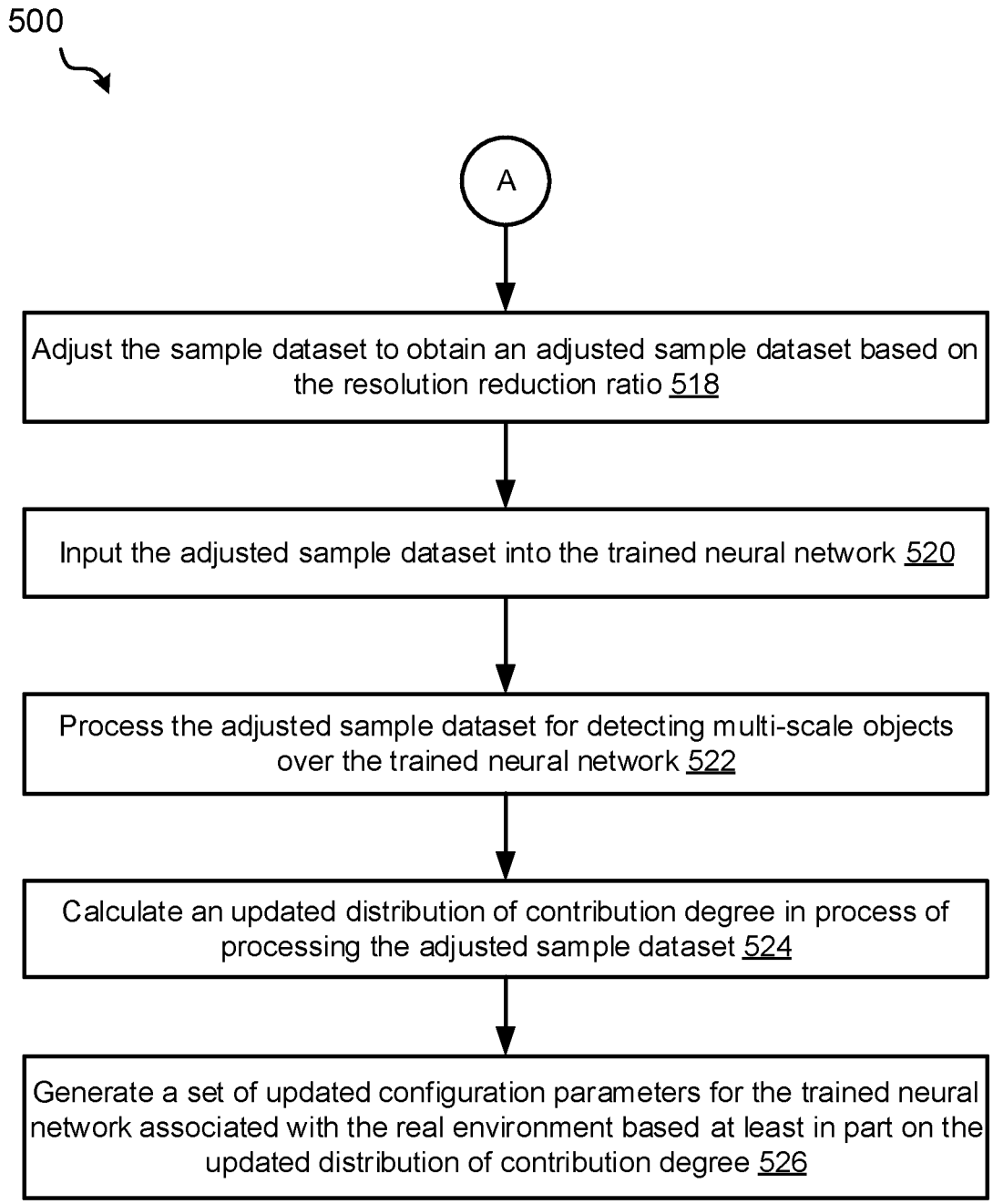
FIG. 5B depicts a flowchart for a second part of a set of operations for updating configuration parameters, according to some embodiments.

With reference now to FIGS. 5A and 5B, a method 500 for updating configuration parameters is depicted, according to some embodiments. Method 500 may start in FIG. 5A and may end in FIG. 5B.

The method 500 begins at block 502, where a sample dataset, including multi-scale objects associated with a specific environment, is received by the computer system/server. The sample dataset may have an existing resolution.

At block 504, the computer system/server inputs the sample dataset into a trained neural network. The trained neural network has a plurality of scale regions for detecting the multi-scale objects.

At block 506, the sample dataset has been processed for detecting the multi-scale objects by means of the trained neural network.

At block 508, the computer system/server obtains an activation frequency of each of the plurality of scale regions. The activation frequency (or frequencies) may be obtained in the course of processing the sample dataset for detecting the multi-scale objects.

At block 510, the computer system/server calculates an activation probability of each of the plurality of scale regions associated with the specific environment. The activation probability is associated with the activation frequency of each of the plurality of scale regions.

At block 512, the computer system/server generates a distribution of contribution degree in the course of processing the sample dataset according to the activation probability of each of the plurality of scale regions.

At block 514, the computer system/server compares the activation probability of each of the plurality of scale regions with a second threshold value of the activation probability. The second threshold value is a value to indicate requests or expectations of users on reducing the computational costs (for example, between 0 to 1), and can be set by users in advance.

At block 516, the computer system/server generates a set of configuration parameters comprising a resolution reduction ratio for the sample dataset, in response to the activation probability of at least one of the scale regions having a high spatial resolution being less than the second threshold value. The resolution reduction ratio may increase the activation probability of at least one of the scale regions having a high spatial resolution to at least meet the second threshold value by reducing the existing resolution (for instance, by multiplying the existing resolution by the resolution reduction ratio).

At block 518, the computer system/server adjusts the sample dataset to obtain an adjusted sample dataset based on the resolution reduction ratio. The adjusted sample dataset may have an adjusted resolution obtained from multiplying the existing resolution by the resolution reduction ratio. For instance, the sample dataset has an existing resolution, such as 1024×1024, and the resolution reduction ratio may be 0.5×0.5, therefore the adjusted sample dataset based on the resolution reduction ratio is 512×512. To maintain the normal trained neural network when operating the adjusted sample dataset, other factors such as network structures, input data formats, input data size limits, etc. might be considered in the course of adjusting the sample dataset.

At block 520, the computer system/server inputs the adjusted sample dataset into the trained neural network.

At block 522, the computer system/server processes the adjusted sample dataset for detecting the multi-scale objects by means of the trained neural network.

At block 524, the computer system/server calculates an updated distribution of contribution degree in the course of, or while, processing the adjusted sample dataset. The contribution degree is associated with each of the plurality of scale regions.

At block 526, the computer system/server generates a set of updated configuration parameters associated with the specific environment for the trained neural network based, at least in part, on the updated distribution of contribution degree.

To further reduce the computational costs, the set of updated configuration parameters comprises, for instance, an updated array of to-be-pruned scale regions based on the updated distribution of contribution degree, which may be generated by the related operation disclosed in the present disclosure.

Figure 6:
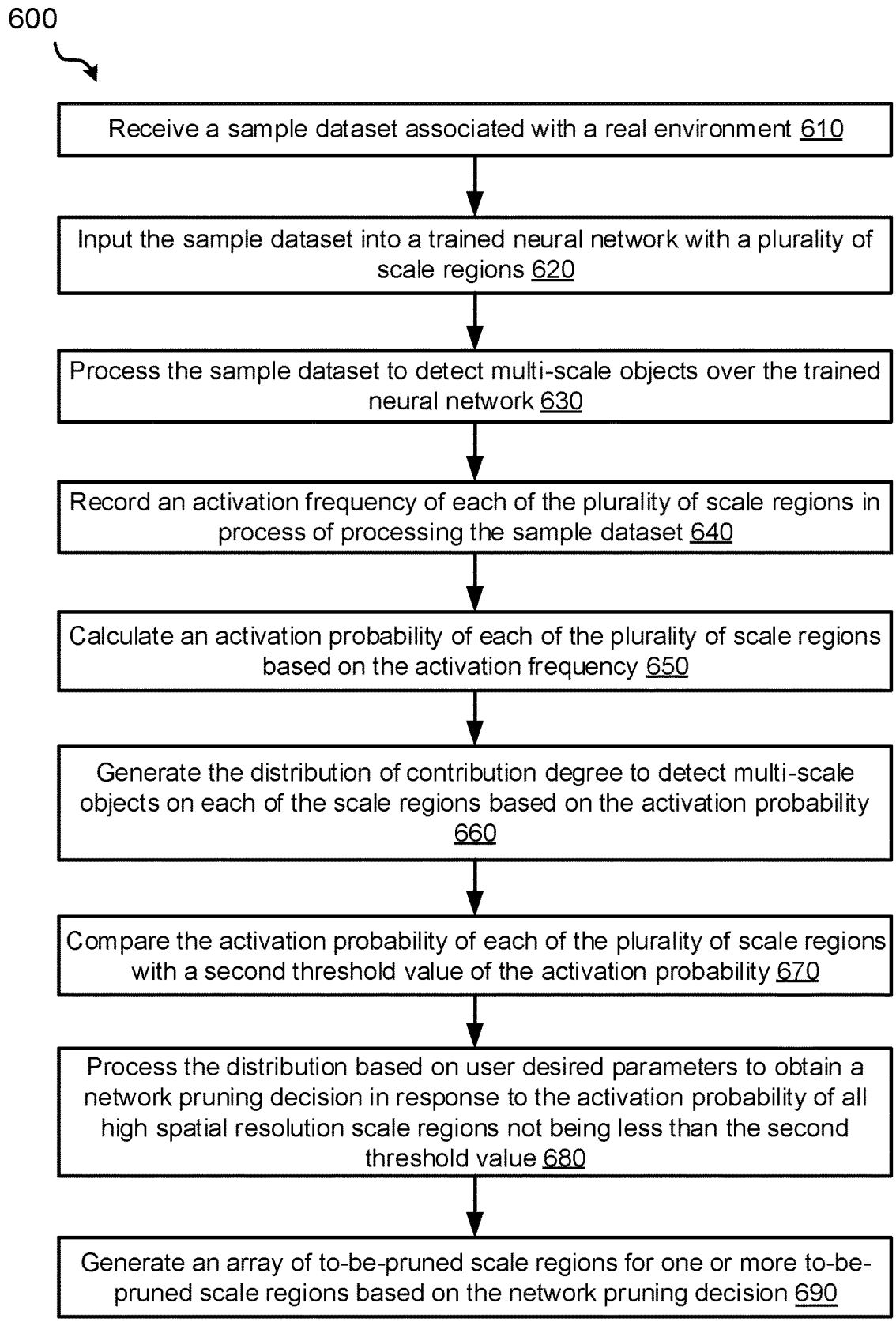
FIG. 6 depicts a flowchart of a set of operations for generating an array of to-be-pruned scale regions, according to some embodiments.

With reference now to FIG. 6, a method for generating an array of to-be-pruned scale regions is depicted, according to some embodiments.

The method 600 begins at block 610, where a sample dataset including multi-scale objects associated with a specific environment is received by the computer system/server. The sample dataset may have an existing resolution. At block 620, the computer system/server inputs the sample dataset into a trained neural network which has a plurality of scale regions for detecting the multi-scale objects. At block 630, the sample dataset has been processed for detecting the multi-scale objects by means of the trained neural network. At block 640, the computer system/server obtains an activation frequency of each of the plurality of scale regions in the course of processing the sample dataset for detecting the multi-scale objects. At block 650, the computer system/server calculates an activation probability of each of the plurality of scale regions associated with the specific environment. The activation probability is associated with the activation frequency of each of the plurality of scale regions. At block 660, the computer system/server generates a distribution of contribution degree in the course of processing the sample dataset according to the activation probability of each of the plurality of scale regions. At block 670, the computer system/server compares the activation probability of each of the plurality of scale regions with a second threshold value of the activation probability.

At block 680, the computer system/server processes the distribution of contribution degree, based on one or more user desired parameters related to pruning the plurality of scale regions, to obtain a network pruning decision in response to the activation probability of all high spatial resolution scale regions not being less than the second threshold value.

At block 690, the computer system/server generates an array of to-be-pruned scale regions for one or more pruned scale regions based on the network pruning decision.

Based on the set of configuration parameters or updated configuration parameters generated from the method disclosed in the present disclosure, the computer system/server further processes raw data obtained from the specific environment (for instance, from one or more visual data capturing devices deployed in the specific environment) by means of the adjusted trained neural network for detecting multi-scale objects. The adjusted trained neural network has been adjusted according to the set of configuration parameters or updated configuration parameters before processing the raw data. The adjusted trained neural network can more effectively reducing the computational costs and the respective system memory requirements and increase detection speed. At the same time, the accuracy of multi-scale objects has been maintained as user's expectation.

In some embodiments, the one or more visual data capturing devices have a warm-up stage, and the method disclosed in the present disclosure has been performed in the warm-up stage. Then, the raw data obtained by the one or more visual data capturing devices is processed by means of the adjusted trained neural network according to the set of configuration parameters or updated configuration parameters to perform the inference to the multi-scale objects more efficiently and economically.

It should be noted that the processing of the method (e.g., method 200, 300, 400, 500, 600, etc.) for detecting multi-scale objects by means of a trained neural network (or achieved by the system for detecting multi-scale objects by means of a trained neural network), according to some embodiments, could be implemented by computer system/server 902 of FIG. 9.

Figure 7:
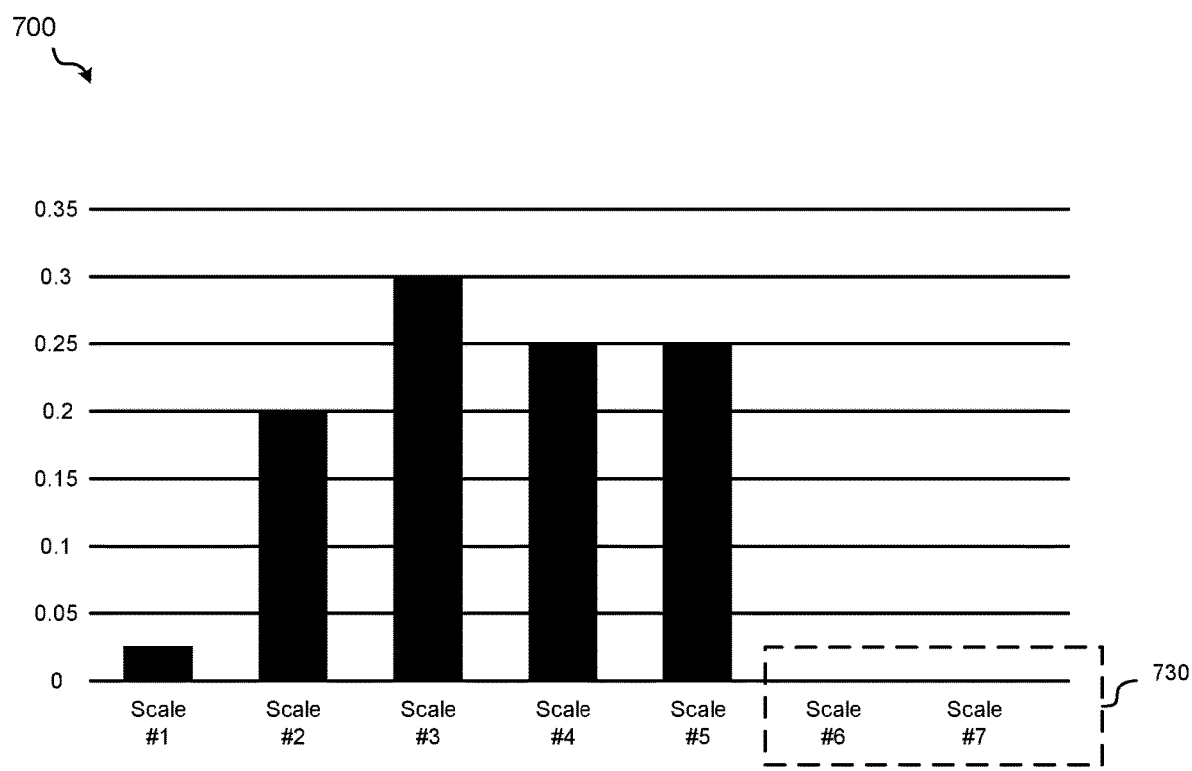
FIG. 7 depicts a diagram of an exemplary distribution of a far view, according to some embodiments.

With reference now to FIG. 7, a diagram of an exemplary distribution 700 of a far view is depicted, according to some embodiments. The distribution 700 may depict an exemplary operation on how to prune the trained neural network. The pruning may be based on one user desired parameters related to pruning the plurality of scale regions and a distribution of contribution degree for detecting multi-scale objects according to each of the plurality of scale regions in the course of processing the sample dataset based on the activation probability.

The distribution of contribution degree for detecting multi-scale objects may be based on the activation probability in the course of processing a sample dataset associated with a far view. Most of the objects in the set of the sample data, compared to the objects related to a normal shot or view, have smaller scales. The trained neural network comprises seven different scale regions, and each of the scale regions may have a region label, such as Scale #1, Scale #2, Scale #3, Scale #4, Scale #5, Scale #6, and/or Scale #7. Each scale region may correspond to detecting a specific scale object in the course of processing the sample dataset. According to the activation frequency of each of the plurality of scale regions in the course of processing the sample dataset for detecting the multi-scale objects, the activation probability of each of the plurality of scale regions based on the activation frequency has been calculated. For instance, the activation probability of the scale region labeled as Scale #3 is 0.3. The distribution of contribution degree for detecting multi-scale objects based on the activation probability has been generated. For instance, the Y axis indicates the activation probability of each of the plurality of scale regions and the X axis indicates the scale regions. In some instances, the scale regions are ordered on the X axis according to numbers of the region labels. In other instances, the scale regions are ordered on the X axis according to spatial resolution sizes of the scale regions as an increasing or decreasing sequence. The computer system/server further processes the distribution of contribution degree based on one or more user desired parameters related to pruning the plurality of scale regions to obtain a network pruning decision. The one or more user desired parameters generally comprises at least one first threshold value of the activation probability. The first threshold value of the activation probability may be 0.01, and a network pruning decision is obtained such that each of scale regions which has an activation probability under the first threshold value should be pruned from the trained neural network, such as Scale #6 and Scale #7. Finally, an array of to-be-pruned scale regions (e.g., to-be-pruned scale region 730) for one or more pruned scale regions is generated based on the network pruning decision.

In some embodiments, region quantities and region labels of the pruned scale regions are included in the array of to-be-pruned scale regions. For instance, the array of to-be-pruned scale regions 730 includes Scale #6 and Scale #7, which means the array of to-be-pruned scale regions 730 comprises two scale regions and the region labels are Scale #6 and Scale #7.

Figure 8:
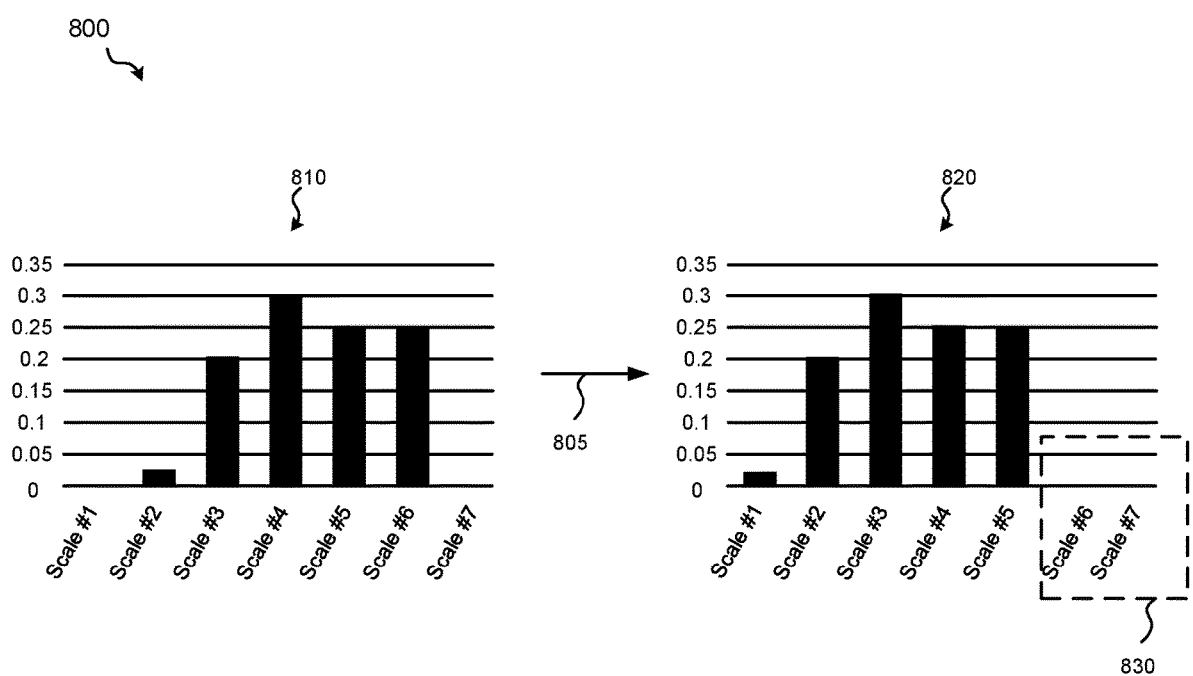
FIG. 8 depicts a diagram of an exemplary distribution of a near view, according to some embodiments.

With reference now to FIG. 8, a diagram of an exemplary distribution environment 800 of a near view is depicted, according to some embodiments.

As shown in FIG. 8, a distribution 810 of contribution degree for detecting multi-scale objects based on the activation probability in the course of processing a sample dataset associated with a near view is provided. Most of the objects in the set of the sample data, compared to the objects related to a normal shot or view, have larger scales. The trained neural network also comprises seven different scale regions, and each of the scale regions has a region label, such as Scale #1, Scale #2, Scale #3, Scale #4, Scale #5, Scale #6, or Scale #7. The scale regions form Scale #1 to Scale #7 have different spatial resolutions as a decreasing sequence, which means Scale #1 has the highest spatial resolution in the sequence and Scale #7 has the lowest spatial resolution in the sequence. Each of the scale regions corresponds to a detected specific scale object in the course of processing the sample dataset. According to the activation frequency of each of the plurality of scale regions in the course of processing the sample dataset for detecting the multi-scale objects, the activation probability of each of the plurality of scale regions based on the activation frequency has been calculated. For instance, the activation probability of the scale region labeled as Scale #4 is 0.3. The distribution 810 of contribution degree for detecting multi-scale objects based on the activation probability has been generated. For instance, the Y axis indicates the activation probability of each of the plurality of scale regions and the X axis indicates the scale regions. Then the computer system/server may compare the activation probability of each of the plurality of scale regions with a second threshold value of the activation probability.

In some instances, the second threshold value of the activation probability s 0.01. In response to the activation probability of at least one of the scale regions that has high spatial resolution (e.g., Scale #1 in FIG. 8) being less than the second threshold value, the computer system/server generates a set of configuration parameters comprising a resolution reduction ratio for the sample dataset. The computer system/server adjusts the sample dataset (depicted in operation 805) to obtain an adjusted sample dataset based on the resolution reduction ratio and inputs the adjusted sample dataset into the trained neural network. After the course of processing the adjusted sample dataset by means of the trained neural network, the computer system/server calculates an updated distribution 820 of contribution degree for detecting multi-scale objects on each of the plurality of scale regions in the course of processing the adjusted sample dataset for detecting the multi-scale objects. As a result, the activation probability of Scale #1 has been increased to meet the second threshold value 0.01 in the updated distribution 820 of contribution degree. The updates may be according to the adjusted sample dataset in which the larger scales of the objects have been reduced for the reduced resolution of the adjusted sample dataset.

As shown in FIG. 8, the computer system/server generates a set of updated configuration parameters for the trained neural network associated with the specific environment based at least in part on the updated distribution 820 of contribution degree. For instance, the computer system/server further processes the updated distribution 820 of contribution degree based on one or more user desired parameters related to pruning the plurality of scale regions to obtain an updated network pruning decision. The one or more user desired parameters comprises at least one first threshold value of the activation probability. The first threshold value of the activation probability is 0.01 in the updated distribution 820. The resulting updated network pruning decision would likely suggest that each of scale regions with an activation probability under the first threshold value (i.e., Scale #6 and Scale #7) should be pruned from the trained neural network. The set of updated configuration parameters comprising the updated to-be-pruned scale regions array (in this example, to-be-pruned scale region 830) is generated based on the updated network pruning decision.

Referring to FIG. 9, computer system 900 is a computer system/server 902 is shown in the form of a general-purpose computing device, according to some embodiments. In some embodiments, computer system/server 902 is located on the linking device. In some embodiments, computer system 902 is connected to the linking device. The components of computer system/server 902 may include, but are not limited to, one or more processors or processing units 910, a system memory 960, and a bus 915 that couples various system components including system memory 960 to processor 910.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 960 can include computer system readable media in the form of volatile memory, such as random-access memory (RAM) 962 and/or cache memory 964. Computer system/server 902 may further include other removable/non-removable, volatile/non-volatile computer system storage media. By way of example only, storage system 965 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 960 may include at least one program product having a set (e.g., at least one) of program modules that are configured to carry out the functions of embodiments of the disclosure.

Program/utility 968, having a set (at least one) of program modules 969, may be stored in memory 960 by way of example, and not limitation, as well as an operating system, one or more application programs, other program modules, and program data. Each of the operating system, one or more application programs, other program modules, and program data or some combination thereof, may include an implementation of a networking environment. Program modules 969 generally carry out the functions and/or methodologies of embodiments of the invention as described herein.

Computer system/server 902 may also communicate with one or more external devices 940 such as a keyboard, a pointing device, a display 930, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 920. Still yet, computer system/server 902 can communicate with one or more networks such as a local area network (LAN), a general wide area network (WAN), and/or a public network (e.g., the Internet) via network adapter 950. As depicted, network adapter 950 communicates with the other components of computer system/server 902 via bus 915. It should be understood that although not shown, other hardware and/or software components could be used in conjunction with computer system/server 902. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method for multi-scale object detection, the method comprising:
  receiving, by one or more processors, a sample dataset including multi-scale objects associated with a specific environment, wherein the sample dataset has an existing resolution;

inputting, by one or more processors, the sample dataset into a trained neural network, wherein the trained neural network has a plurality of scale regions;

processing, by one or more processors, the sample dataset for detecting the multi-scale objects by means of the trained neural network;

calculating, by one or more processors, a distribution of contribution degree in a course of processing the sample dataset, wherein the contribution degree is associated with each of the plurality of scale regions; and generating, by one or more processors, a set of configuration parameters associated with the specific environment for the trained neural network based at least in part on the distribution of contribution degree.

2. The method of claim 1, wherein:
the trained neural network is a convolutional neural network, and
each of the plurality of scale regions comprises one or more convolutional layers.

3. The method of claim 1, wherein:
the sample dataset is received from one or more visual data capturing devices, and
the one or more visual data capturing devices are deployed in the specific environment.

4. The method of claim 3, wherein the one or more visual data capturing devices have a warm-up stage, and the computer-implemented method has been performed in the warm-up stage.

5. The method of claim 1, wherein the calculating, by one or more processors, the distribution of contribution degree in the course of processing the sample dataset comprises:
obtaining, by one or more processors, an activation frequency of each of the plurality of scale regions in the course of processing the sample dataset for detecting the multi-scale objects;
calculating, by one or more processors, an activation probability of each of the plurality of scale regions, wherein the activation probability is based on the activation frequency of each of the plurality of scale regions; and
generating, by one or more processors, the distribution of contribution degree in the course of processing the sample dataset based on the activation probability of each of the plurality of scale regions.

6. The method of claim 5, wherein the generating, by one or more processors, the set of configuration parameters associated with the specific environment for the trained neural network based at least in part on the distribution of contribution degree comprises:
processing, by one or more processors, the distribution of contribution degree based on one or more user desired parameters related to pruning the plurality of scale regions to obtain a network pruning decision; and
generating, by one or more processors, an array of to-be-pruned scale regions for one or more to-be-pruned scale regions based on the network pruning decision and the one or more desired performance parameters, wherein the array of to-be-pruned scale regions excludes at least one scale region in the plurality of scale regions.

7. The method of claim 6, wherein the one or more user desired parameters comprises at least one first threshold value of the activation probability.

8. The method of claim 7, wherein the activation probability of each of the one or more to-be-pruned scale regions is less than the first threshold value of the activation probability.

9. The method of claim 6, wherein the array of to-be-pruned scale regions comprises quantities and labels of the one or more to-be-pruned scale regions.

10. The method of claim 5, wherein the generating, by one or more processors, a set of configuration parameters associated with the specific environment for the trained neural network comprises:
comparing, by one or more processors, the activation probability of each of the plurality of scale regions with a second threshold value of the activation probability;
processing, by one or more processors, the distribution of contribution degree based on one or more user desired parameters related to pruning the plurality of scale regions to obtain a network pruning decision in respond to the activation probability of all high spatial resolution scale regions being not less than the second threshold value; and
generating, by one or more processors, an array of to-be-pruned scale regions for one or more to-be-pruned scale regions based on the network pruning decision, wherein the array of to-be-pruned scale regions excludes at least one scale region in the plurality of scale regions.

11. The method of claim 5, wherein the generating, by one or more processors, a set of configuration parameters associated with the specific environment for the trained neural network comprises:
comparing, by one or more processors, the activation probability of each of the plurality of scale regions with a second threshold value of the activation probability; and
generating, by one or more processors, a set of configuration parameters comprising a resolution reduction ratio of the sample dataset in respond to the activation probability of at least one of the scale regions which has a high spatial resolution being less than the second threshold value.

12. The method of claim 11, wherein the generating, by one or more processors, a set of configuration parameters for the trained neural network associated with the specific environment further comprises:
adjusting, by one or more processors, the sample dataset to obtain an adjusted sample dataset based on the resolution reduction ratio, wherein the adjusted sample dataset has an adjusted resolution obtained by multiplying the existing resolution by the resolution reduction ratio;
inputting, by one or more processors, the adjusted sample dataset into the trained neural network;
processing, by one or more processors, the adjusted sample dataset for detecting the multi-scale objects by means of the trained neural network;
calculating, by one or more processors, an updated distribution of contribution degree in the course of processing the adjusted sample dataset, wherein the contribution degree is associated with each of the plurality of scale regions; and
generating, by one or more processors, a set of updated configuration parameters associated with the specific environment for the trained neural network based at least in part on the updated distribution of contribution degree.

13. The method of claim 12, wherein the set of updated configuration parameters comprises an updated array of to-be-pruned scale regions.

14. The method of claim 1, further comprising processing, by one or more processors, raw data obtained from the specific environment by means of an adjusted trained neural network based on the set of configuration parameters, wherein the adjusted trained neural network is obtained from adjusting the trained neural network according to the set of configuration parameters.

15. A system for multi-scale object detection, the system comprising at least one processor and a memory storing program instructions thereon, the program instructions executable by the at least processor to cause the system to:
receive a sample dataset including multi-scale objects associated with a specific environment, wherein the sample dataset has an existing resolution;
input the sample dataset into a trained neural network, wherein the trained neural network has a plurality of scale regions;
process the sample dataset for detecting the multi-scale objects by means of the trained neural network;
calculate a distribution of contribution degree in a course of processing the sample dataset, wherein the contribution degree is associated with each of the plurality of scale regions; and
generate a set of configuration parameters associated with the specific environment for the trained neural network based at least in part on the distribution of contribution degree.

16. The system of claim 15, wherein:
the trained neural network is a convolutional neural network, and
each of the plurality of scale regions comprises one or more convolutional layers.

17. The system of claim 15, wherein the program instructions executable by the at least one processor to cause the system to process raw data obtained from the specific environment by means of an adjusted trained neural network based on the set of configuration parameters, wherein the adjusted trained neural network is obtained from adjusting the trained neural network according to the set of configuration parameters.

18. A computer program product for multi-scale object detection, the computer program product comprising a computer readable storage medium having program instructions embodied therewith, the program instructions executable by at least one processor to cause the at least one processor to:
receive a sample dataset including multi-scale objects associated with a specific environment, wherein the sample dataset has an existing resolution;
input the sample dataset into a trained neural network, wherein the trained neural network has a plurality of scale regions;
process the sample dataset for detecting the multi-scale objects by means of the trained neural network;
calculate a distribution of contribution degree in a course of processing the sample dataset, wherein the contribution degree is associated with each of the plurality of scale regions; and
generate a set of configuration parameters associated with the specific environment for the trained neural network based at least in part on the distribution of contribution degree.

19. The computer program product of claim 18, wherein:
the trained neural network is a convolutional neural network, and
each of the plurality of scale regions comprises one or more convolutional layers.

20. The computer program product of claim 18, wherein the program instructions executable by the at least one processor to process raw data obtained from the specific environment by means of an adjusted trained neural network based on the set of configuration parameters, wherein the adjusted trained neural network is obtained from adjusting the trained neural network according to the set of configuration parameters.

\* \* \* \* \*